(12) United States Patent
Moiron et al.

(10) Patent No.: US 12,293,054 B2
(45) Date of Patent: May 6, 2025

(54) ADJUSTING STREAMING OF SCREEN DATA BASED ON WINDOW VISIBILITY

(71) Applicant: Omnissa, LLC, Mountain View, CA (US)

(72) Inventors: Sandro Rodrigo Ferreira Moiron, Mountain View, CA (US); Alan Hourihane, Deganwy (GB)

(73) Assignee: Omnissa, LLC, Mountain View, CA (US)

( * ) Notice: Subject to any disclaimer, the term of this patent is extended or adjusted under 35 U.S.C. 154(b) by 144 days.

(21) Appl. No.: 18/158,415

(22) Filed: Jan. 23, 2023

(65) Prior Publication Data

US 2024/0248573 A1    Jul. 25, 2024

(51) Int. Cl.
*G06F 3/0481* (2022.01)
*G06F 9/451* (2018.01)

(52) U.S. Cl.
CPC ............ *G06F 3/0481* (2013.01); *G06F 9/452* (2018.02)

(58) Field of Classification Search
CPC .................................................... G06F 3/0481
See application file for complete search history.

(56) References Cited

U.S. PATENT DOCUMENTS

| | | | |
|---|---|---|---|
| 2015/0215624 A1* | 7/2015 | Wei ........................ | G06F 3/0481 715/740 |
| 2016/0284105 A1* | 9/2016 | Dawood .............. | H04N 19/137 |
| 2019/0104311 A1* | 4/2019 | Amer .................. | H04N 19/177 |

* cited by examiner

*Primary Examiner* — Shivang I Patel
(74) *Attorney, Agent, or Firm* — Kim & Stewart LLP

(57) ABSTRACT

Systems and methods are described for adjusting streaming of screen data from a server to a client based on visibility of the window in which the screen data is presented on the client. Visibility of a window in the graphical user interface (GUI) can be monitored, for example by detecting when the window is minimized or obscured by other objects in the GUI, and the streaming of screen data to the window can be dynamically adjusted based on the window visibility. When the window is minimized or fully obscured, the streaming of screen data can be stopped. When the window is partially obscured, the streaming can be modified such as by decreasing the frame rate.

15 Claims, 4 Drawing Sheets

ADJUSTING STREAMING OF SCREEN DATA BASED ON WINDOW VISIBILITY

TECHNICAL FIELD

The present disclosure generally relates to streaming screen data from a server to a client and more specifically to techniques for adjusting data streams and encoding methods to optimize resource utilization in screen data streaming.

BACKGROUND OF THE INVENTION

In various streaming technologies, screen data such as frames of a video or a graphical user interface (GUI) of an application or desktop is sent as a stream of pixel data to a client device at the location of a user. For example, when a user accesses a remote desktop or a remote application on a client device, the GUI of the desktop or the application is captured on the server and streamed to the client device to be displayed to the user. Similarly, when a user is watching a video that is streamed from a server, video pixel data is conveyed from the server and displayed on the user's client device.

In each case, the pixel data is encoded at the server and conveyed to the client device over a network connection. On the client device, the received pixel data is decoded to render frames that are displayed to the user, producing the content (video, GUI, etc.). Generally, the process consumes computing resources of the server (e.g., to encode the screen data), computing resources of the client (e.g., to decode and render the screen data), as well as network resources (e.g., bandwidth) to transmit the screen data. Particularly in the case of high resolution and/or high framerate content, the burden on resources can be substantial.

While certain expenditure of resources may be necessary for delivering high quality screen content to a user, resources may be wasted when multimedia content is delivered and processed but the window in which the content is to be displayed is fully or partially hidden from a user, such as when the window was minimized or obscured by other objects in the interface. In such cases, even though some content may not be viewable due to the window or parts of it being hidden, resources would nonetheless be consumed for encoding, transmitting, and decoding the screen data.

What is needed is a more efficient approach for adjusting streaming of screen data based on visibility in the GUI of the window in which the screen data is presented.

DETAILED DESCRIPTION OF THE INVENTION

Figure 1:
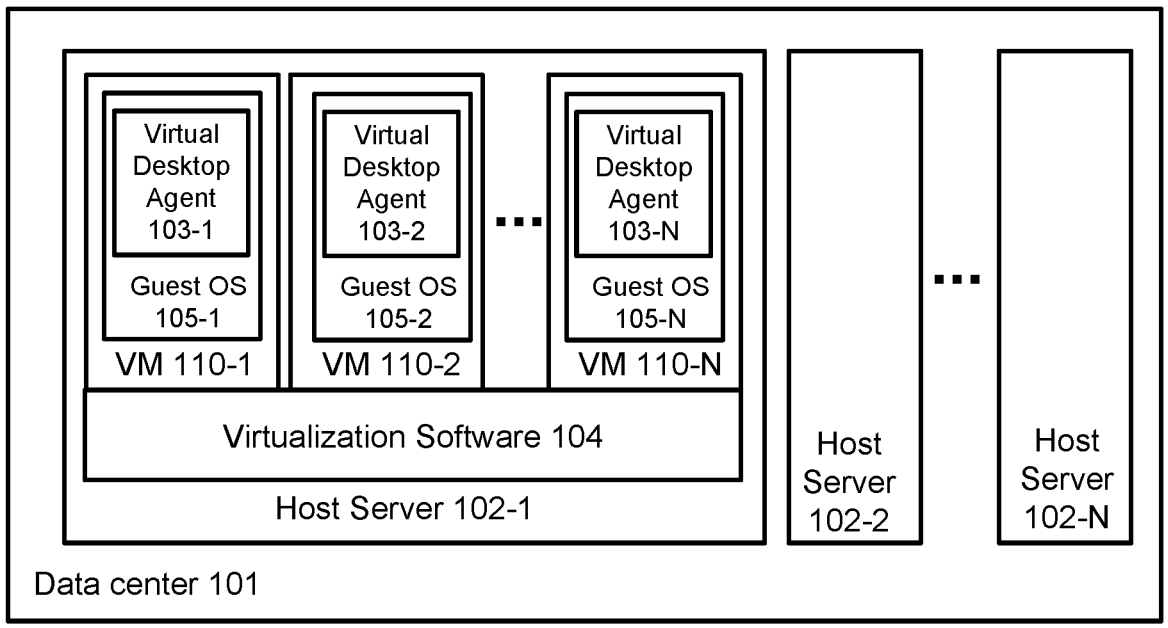
FIG. 1 illustrates an example of a virtual desktop environment, in accordance with various embodiments.
Figure 1:
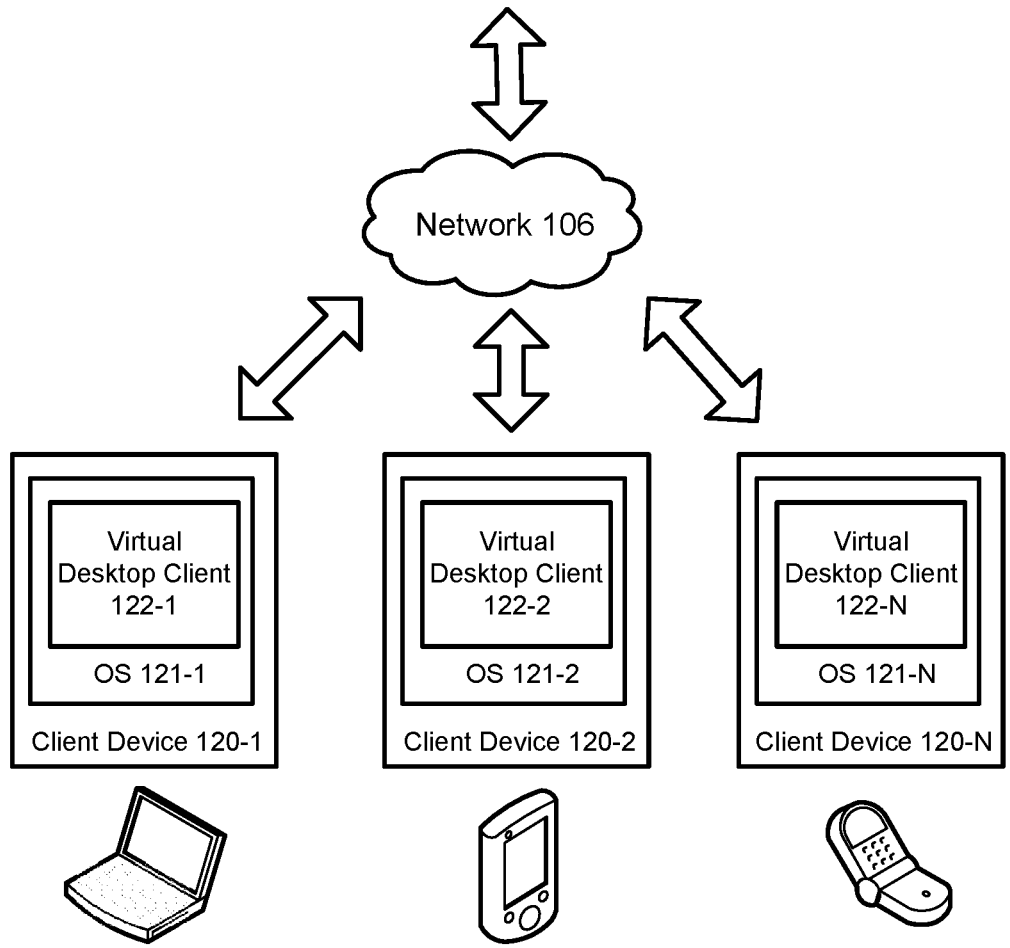

Systems and methods in accordance with various embodiments of the present disclosure overcome at least some of the above-mentioned shortcomings and deficiencies by providing efficient ways for adjusting streaming of screen data to a client based on visibility of the window in which the screen data is presented on the client. In particular, embodiments described herein leverage a mechanism for monitoring visibility of a window in the graphical user interface (GUI), for example by detecting when the window is minimized or obscured by other objects in the GUI, and dynamically adjusting the streaming of screen data to the window based on the window visibility.

Conventionally, when a user viewed a video in a virtual desktop or in a video streaming application, the video could be streamed from the server to the client with standard settings (e.g., high frame rate of 30 fps or higher, high resolution, etc.) and processed by the client for being presented in a client application window even when the window was minimized or obscured in the GUI (e.g., covered fully or partially by another window). The server encoded and transmitted the screen data and the client decoded and processed it, even though the video may be fully or partially invisible to the user, resulting in a waste of server, client, and network bandwidth resources. In various embodiments, to address this inefficiency, streaming of screen data can be adjusted based on the visibility conditions of the application window.

Different approaches can be utilized for adjusting screen data streaming based on window visibility. For example, when the window is minimized or fully obscured (e.g., fully covered another window, a lock screen, screen saver, another user interface (UI) element, etc.), the streaming of screen data can be discontinued (stopped or suspended). Because the video would not be visible in the GUI even if it was streamed to the client and processed, stopping video streaming in such cases can conserve resources without any impact on user experience. As used herein, the terms "stop", "discontinue", or "suspend" in reference to the transmission of the screen data are used interchangeably and broadly have the same meaning.

In other cases, such as when the window is partially obscured, the streaming can be adjusted to decrease resource consumption while continuing to stream the video. For example, the streaming of screen data may be adjusted by lowering the frame rate, decreasing the image quality, decreasing resolution, changing to different compression settings, or by any other approach that results in decreased consumption of server, client, and/or network resources. In such cases, because content quality may not be as important to the user when the window is only partially visible, resources can be conserved by adjusting the streaming while maintaining adequate quality for providing good user experience.

As a result, server, client, and network resources can be conserved while delivering a good user experience. The techniques can be implemented in various environments where encoded screen data is conveyed from a server to a client, such as video streaming, teleconferencing, remote application accessing, etc., and can be particularly advantageous in environments where servers experience high demand for screen content (e.g., video) from multiple clients under congested network conditions, such as in virtual desktop infrastructure (VDI) environments.

As used throughout this disclosure in the context of remote desktop environments, the terms, "desktop", "remote desktop", and "virtual desktop" are used interchangeably and refer to an instance of an operating system and/or applications that run(s) remotely with respect to the user. In a conventional VDI or DAAS environment, each virtual desktop corresponds to a virtual machine (VM) executed on a host server (i.e., a host computing device) that is physically located in a remote datacenter. Each host server may host any number of virtual machines (e.g., tens, hundreds, etc.) and each virtual machine may be owned by an individual user. The virtual machine typically includes a guest operating system (e.g., Windows) capable of executing applications for the user and the virtual machine is used to provide a virtual desktop for the individual user. The user who owns the virtual desktop can remotely log into his or her virtual desktop using a client device that establishes a network connection (e.g., Wide Area Network connection) with the host server and remotely execute various applications on the virtual machine as if the desktop was running on the user's local client device. The client device can be any computing device capable of establishing a network connection, including but not limited to personal computers (PCs), laptops, mobile phones, tablet computers, wearable devices (e.g., smart watches, electronic smart glasses, etc.) or the like.

When a client device is accessing a remote desktop using a remote display protocol (e.g., RDP, PCoIP, VNC, etc.), the graphical user interface (GUI) of the desktop is generated on the server, the GUI image data is then encoded and transmitted over the network to the client device, where it is decoded and displayed to the user. For example, in one embodiment, the framebuffer pixel data on the server is encoded using a codec, such as H264, and transmitted over an Internet connection to the client, where the data is decoded and rendered on a local display screen to the user. Similarly, any user input information, such as keyboard and mouse events, is transmitted from the client device to the server over the network connection, where it may in turn cause various updates to the GUI of the remote desktop. In this manner, the user is able to view the GUI of the remote desktop and interact with it as if the desktop was actually running on the local client device, even though the desktop is actually executing remotely.

FIG. 1 illustrates an example of a virtual desktop environment, in accordance with various embodiments. The virtual desktop environment, such as VDI or DAAS environment, includes host servers (102-1, 102-2, 102-N) that are communicatively coupled with a number of client devices (120-1, 120-2, 120-N) via a network 106. Network 106 may be a wide area network (WAN), or other form of remote communication link between the host servers (102-1, 102-2, 102-N) and client devices (120-1, 120-2, 120-N). Network 106 may further include numerous other components, such as one or more firewalls, connection brokers, management servers, etc., which are not shown here so as not to obscure salient features of the remote desktop environment. Host servers (102-1, 102-2, 102-N) may physically reside in a data center 101 of the enterprise (e.g., in case of VDI) or in a data center of a third-party service provider (e.g., in case of DAAS).

By way of illustration, host server 102-1 can interoperate with client devices (120-1, 120-2, 120-N) to provide virtual desktop services to users of client devices (120-1, 120-2, 120-N). For example, host server 102-1 can host, for each user, a desktop that is presented by a guest operating system (such as one of the guest operating systems 105-1, 105-2, 105-N) running on a virtual machine (such as one of the virtual machines 110-1, 110-2, 110-N) on host server 102-1. In this context, the terms "desktop", "remote desktop", and "virtual desktop" refer to a computing environment in which a user can launch, interact with, and manage the user's applications, settings, and data. Each client device (120-1, 120-2, 120-N) can allow a user to view on a desktop graphical user interface (on a local display device) his/her desktop that is running remotely on host server 102-1, as well as provide commands for controlling the desktop. In this manner, the users of client devices (e.g., 120-1, 120-2, 120-N) can interact with the desktops hosted on host server 102-1 as if the desktops were executing locally on client devices (120-1, 120-2, 120-N).

In the embodiment of FIG. 1, host server 102-1 includes virtualization software 104 that supports the execution of one or more virtual machines (VMs) (e.g., 110-1, 110-2, 110-N). The virtualization software 104 may be a hypervisor, a virtual machine manager (VMM) or other software that allows multiple virtual machines to share the physical resources of the server. In the illustrated embodiment, each virtual machine (e.g., 110-1, 110-2, 110-N) can execute a guest operating system (e.g., 105-1, 105-2, 105-N) that hosts a desktop for a single user at a time. For example, if five users connect to host server 102-1 for the purpose of initiating remote desktop sessions, the host server 102-1 can launch five VMs, each hosting one desktop for each one of the five users. These types of virtual desktop environments where user desktops are hosted within separate, server-side virtual machines are often referred to as virtual desktop infrastructure (VDI) or Desktop-as-a-Service (DAAS) environments.

In such virtual desktop environments, each client device (e.g., 120-1, 120-2, 120-N) can execute a virtual desktop client (e.g., 122-1, 122-2, 122-N). For example, the virtual desktop client (e.g., 122-1, 122-2, 122-N) can be a stand-alone, designated client application ("native client"), or a web browser ("web client"). In some cases, a standard web browser may be modified with a plugin to operate as a web client. The interaction between the virtual desktop and the client device can be facilitated by such a virtual desktop client (e.g., 122-1, 122-2, 122-N) running in the OS (e.g., 121-1, 121-2, 121-N) on the client device (e.g., 120-1, 120-2, 120-N) which communicates with a server-side virtual desktop agent (e.g., 103-1, 103-2, 103-N) that is running on the guest OS inside the virtual machine (e.g., 110-1, 110-2, 110-N). In particular, the interaction can be performed by the virtual desktop agent transmitting encoded visual display information (e.g., framebuffer data) over the network to the virtual desktop client and the virtual desktop client in turn transmitting user input events (e.g., keyboard, mouse events) to the remote desktop agent.

It should be noted that the particular virtual desktop environment illustrated in FIG. 1 is shown purely for purposes of illustration and is not intended to be in any way inclusive or limiting to the embodiments that are described herein. For example, a typical enterprise VDI deployment would include many more host servers, which may be distributed over multiple data centers, which might include many other types of devices, such as switches, power supplies, cooling systems, environmental controls, and the like, which are not illustrated herein. Similarly, a single host server would typically host many more virtual machines than what is shown in this illustration. It will be apparent to one of ordinary skill in the art that the example shown in FIG. 1, as well as all other figures in this disclosure have been simplified for ease of understanding and are not intended to be exhaustive or limiting to the scope of the invention.

Figure 2:
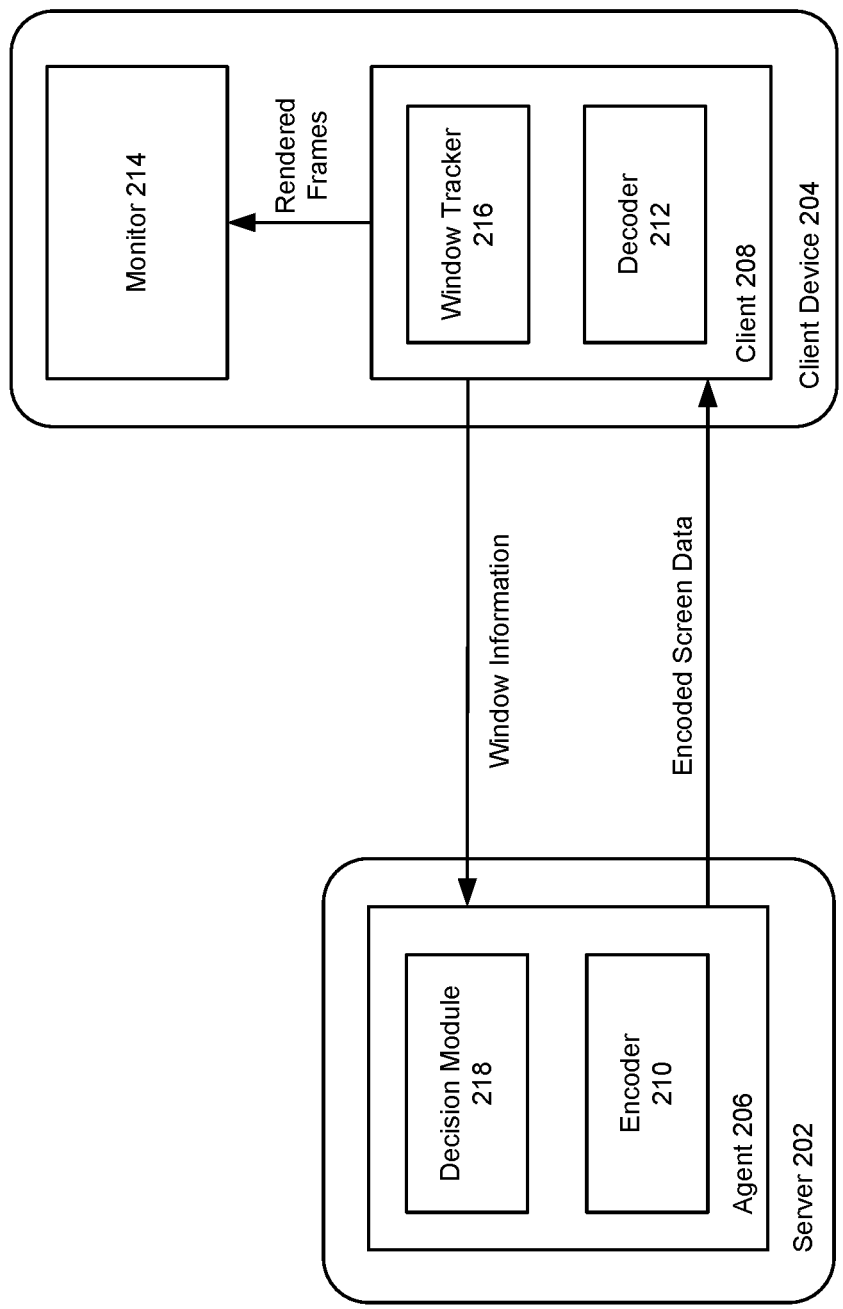
FIG. 2 illustrates an example architecture of a system for adjusting streaming of screen data based on window visibility, in accordance with various embodiments.

FIG. 2 illustrates an example architecture of a system for adjusting streaming of screen data based on window visibility, in accordance with various embodiments. As illustrated in the example of FIG. 2, a server 202, which can physically reside in a data center, can be communicatively linked to a client device 204 via a network. The client device 204 can be a personal computer, laptop, smartphone, tablet, or any other applicable computing device that may be used by a user for consuming screen data. An agent 206 running on the server 202 can communicate with a client 208 running on the client device 204 for conveying the screen data. In various embodiments, the agent 206 can send encoded screen data to the client 208 and the client 208 can process the data to display it (e.g., display rendered frames) in a window of the client 208 (an application window) appearing in the client device GUI on a monitor 214, which may be an integrated or an external monitor of the client device 204.

In various embodiments, the agent 206 can be a virtual desktop agent running in a virtual desktop on the server 202, as described above in the example of FIG. 1. The client 208 can be a virtual desktop client running on the client device 204, enabling a user of the client device 204 to access and interact with the virtual desktop executing on the server, as also further described in the example of FIG. 1 above. During the virtual desktop session, the agent 206 (the virtual desktop agent) can capture the GUI of the virtual desktop on the server and convey it to the client 208 (the virtual desktop client) as a data stream of encoded screen data, as illustrated in the example of FIG. 2. The client 208 can decode and process the received encoded screen data to generate frames that can be displayed in a window of the virtual desktop client 208 appearing in the client device GUI on the monitor 214. The virtual desktop GUI can thus be produced in the virtual desktop client window on the client device GUI and the user can view the virtual desktop and, for example, a video playing in it on the client device 204.

In other embodiments, the system can be implemented in different environments (other than VDI). For example, the agent 206 can be any kind of application configured for sending screen data to the remote client device 204, and the client 208 can be an application configured for rendering the screen data and displaying it to the user of the client device 204 on the monitor 214. For example, the agent 206 and client 208 can be part of various products that implement screen data or video streaming, such as teleconferencing applications, remote application access applications, remote computer access applications, video streaming service applications, etc.

In various embodiments, an encoder 210 can operate on the agent 206 for encoding the screen data, which can be a hardware or software encoder, before the screen data is conveyed to the client 208. Some examples of encoders that might be used are H.264, JPG/PNG, H.265, MPEG-2, MPEG-4, among others. Generally, the encoded screen data can contain sequential frame data that has been encoded to facilitate transmission of the data. The encoded screen data can be received on the client device 204, decoded by a decoder 212, which can be a hardware or software decoder, and processed as necessary to render frames. Once a frame is rendered, it can be passed to and displayed on the monitor 214 in the client application window. For example, once a frame is rendered, the operating system (OS) of the client device 204 can be called to display the frame on the monitor 214, e.g., the client 208 can make such a call to the client device 204 OS.

In various embodiments, the client 208 can contain a window tracker module 216, which can collect various window information relating to visibility in the client device GUI of the client 208 window where the received screen data is displayed. The window information can include various information relating to visibility of the window in the GUI and/or information relating to events taking place on the client device 204 affecting visibility of the window in the client device GUI. As will be explained in further detail below, this information can indicate if the window is fully or partially obscured in the GUI, whether the window has been minimized, etc.

The window tracker 216 can convey the window information (and updates to the window information) to the agent 206, where a decision module 218 can analyze the window information to determine how streaming should be adjusted. For example, based on the window information, the decision module 218 can determine that streaming should be stopped. In this case, the decision module 218 can produce a command or instruction for the agent 206 to stop encoding and/or conveying the screen data.

In other cases, based on the window information, the decision module 218 can determine that streaming should be modified in a particular manner (e.g., the encoding method should be modified). In this case, the decision module 218 can produce a corresponding command or instruction for the agent 206 to modify the streaming or the encoding method used to encode the screen data in the manner determined by the decision module 218.

In various embodiments, the decision module 218 can apply various policies, algorithms, or rules, which may be defined by administrators, for determining how to change streaming based on the window information.

It should be noted that the system illustrated in FIG. 2 is provided only by way of example and alternative architectures are feasible without straying from the spirit of the invention. For example, in an embodiment, the decision module 218 may be located on the client device 204 instead of on the server 202 (e.g., It may also be part of the client 208). In this case, the window information can be conveyed from the window tracker directly to the decision module on the client and the decision module can make the determination of whether and/or how to change the streaming. If the decision module determines that a change should be made, whether to stop streaming or modify it, it can send a corresponding message or instruction to the agent 206 instructing it to perform the corresponding change. In response to the message/instruction, the agent can then perform the corresponding change by stopping or modifying the screen data streaming, as the case may be.

In various embodiments, the window information can indicate that the window is minimized. For example, the window tracker 216 can observe operations and/or activities on the client device 204 (e.g., by hooking into or retrieving information from the OS) and detect when the window is minimized or when a minimize command is made (e.g., by the user). In various embodiments, the window tracker 216 can determine when the window has been minimized by analyzing the window region; for example, it can monitor the window region in the GUI and determine that it has been minimized when the region disappears or is fully reduced (with the client 208 is still running).

In various embodiments, the window information can indicate when the window is fully obscured, such as when the window is not minimized but is entirely invisible in the GUI. For example, the window may be fully obscured when it is completely covered/obscured by objects (e.g., other window(s) or UI objects) in the GUI, when the screen saver is active and covers the window, when the lock screen (also known as the "login" screen) is active and covers the window, or when the monitor is off. As applicable, the window tracker 216 can observe operations and/or activities on the client device 204 (e.g., by hooking into or retrieving information from the OS) to detect certain fully obscuring events (e.g., screen saver, lock screen, monitor off, etc.), or by monitoring the region of the window in the GUI to determine if it is obscured by other objects (such as windows or other UI objects).

For example, the window tracker 216 can determine if the window is obscured by other objects in the GUI based on the region of the window and on regions of other objects (e.g., other windows or UI objects) that are above the window in the GUI. To identify which objects are above the window, the window tracker 216 can analyze the Z-order or stacking order of the window and of other objects in the GUI. After identifying the objects that are above the window based on the order, the window tracker 216 can analyze the region of the window and the regions of any objects above the window to determine if the window is obscured by the objects above it. For example, if portions of the window's region are intersected by regions of any objects above it, then those intersected portions of the window can be determined to be obscured. If the entire region of the window is found to be obscured (i.e., intersected by regions of objects above it), then the window tracker can determine that the window is fully obscured. If some portion, but not all, of the window is found to be obscured (i.e., intersected by regions of objects above it), then the window tracker can determine that the window is partially obscured.

In various embodiments, if the window tracker determines that the window is partially obscured, it can further determine an obscuring proportion value for the window, which can also be part of the window information conveyed to the agent 206 and used by the decision module 218 to make streaming adjustment determinations. The obscuring proportion value can be a value such as a percentage, decimal, fraction, etc. corresponding to the proportion of the window's region that is obscured. For example, if a quarter of the window region is obscured, then the obscuring proportion value can be 25%, if one tenth of the region is obscured, the obscuring proportion value can be 10%.

When the decision module 218 receives the window information, it can implement various logic (which can be based in policies, algorithms, etc.) to determine how to adjust streaming based on the window information. For example, in some cases the decision module can determine that streaming and/or encoding should be completely stopped. In other cases the decision module can determine that the streaming should be modified (or the encoding method should be modified). In various embodiments, the encoding method can be modified in any of several ways that results in reduced use of resources, such as network resources (e.g., bandwidth) and/or processing resources such as CPU, GPU, RAM, etc. consumed by components in the system including the server 202 and/or the client device 204 for encoding, decoding, and otherwise sending and processing the data stream, as applicable.

For example, to modify the streaming or encoding, the frame rate can simply be reduced (e.g., from 30 fps to 10 fps), which can be a straightforward and reliable approach for modifying encoding and reducing resource consumption. Various other parameters of the streaming or encoding method can also be modified alone or in combination with others to make adjustments to the streaming, such as decreasing resolution, decreasing image quality, changing compression settings, changing encoders/decoders, and so on, any of which can also conserve processing and/or network resources. Hence, in various embodiments, the decision module 218 can make a determination based on the window information (using a policy, algorithms, etc.) to modify the encoding method by performing one of or any combination of the following: decreasing the frame rate, decreasing the image quality, decreasing the resolution, changing compression (e.g., in a way that reduces resource consumption), changing encoders, etc.

In various embodiments, when the window is minimized or fully obscured (e.g., decision module 218 can receive a window information update indicating that the window is minimized or fully obscured), the streaming (and/or the encoding) can be completely stopped. Or, in some embodiments, the streaming can be reduced to some minimal level so that resources are maximally conserved.

In various embodiments, when the window is partially obscured (e.g., decision module 218 can receive a window information update indicating that the window is partially obscured), the streaming (and/or the encoding) can be modified instead of being stopped. It should be mentioned that in some embodiments the streaming may be stopped during partial obscuring (e.g., in some implementations where that may be desired or when the window is obscured beyond a certain threshold, e.g., 95%) but it may generally be preferable to adjust streaming instead of stopping it completely when the window is partially obscured.

For example, when the window is partially obscured, the streaming can be adjusted in certain ways as described above (e.g., decrease frame rate, quality, etc.) based on policy or logic. In various embodiments, the streaming can be adjusted based on the obscuring proportion value. For example, a policy or an algorithm can indicate at what obscuring proportion values certain adjustments (if any) should be made to the streaming. In various embodiments, the policy can identify thresholds for the obscuring proportion value so that certain prescribed modification to the encoding method are performed once the window's obscuring proportion value exceeds the threshold. Similarly, a policy can provide ranges of obscuring proportion values where the encoding method is to be modified in specific ways for each range. The policy can also provide formulas or algorithms that determine, based on the obscuring proportion value of the window, what modifications are to be made to the encoding method used to encode the screen data.

In an embodiment, the encoding method can be modified in a predetermined way only after a certain threshold obscuring proportion value is observed. For example, the system can have a policy or rule that a particular modification is to be performed (e.g., frame rate is dropped to 20 fps in a system where 30 fps is standard) after when window is more than 10% obscured. This way, the system will not start to change the encoding method and thereby affecting the content quality until the window is at least 10% obscured. Modification to other encoding parameters can likewise be performed based on threshold values being exceeded; frame rate is only being used here an example.

The policy can likewise contain multiple thresholds so that as the obscuring proportion value changes, the encoding method is likewise dynamically adjusted. For example, in addition to the above 10% threshold, the policy can indicate that another modification is performed (e.g., frame rate is dropped to 10 fps) after when window is more than 50% obscured, and that another modification is performed (e.g., frame rate is dropped to 5 fps) when window is more than 75% obscured. As mentioned, other approaches can likewise be implements using ranges of obscuring proportion value, formulas, etc. so that the encoding method can be dynamically adjusted based on different obscuring proportion values.

In various embodiments, after the system has adjusted the streaming due to the window being minimized or obscured, as described above, when the window becomes un-minimized (e.g., restored or maximized), or un-obscured, the adjustments can be reverted. For example, if streaming was stopped due to the window being minimized or fully obscured, once that condition is removed (e.g., user restores window after it is minimized, moves a window or UI object covering it, removes lock screen, etc.) and the window is no longer fully obscured, the window tracker 216 can send a window information update notifying the decision module 218 that the window is no longer minimized/fully obscured and the decision module 218 can instruct the agent 206 to restart streaming. Similarly, after encoding is modified due to the window being partially obscured, once the window is no longer obscured, the window tracker 216 can send a corresponding window information update to notify the decision module 218 of the change and the decision module 218 can instruct the agent 206 to revert the encoding method to standard parameters.

Figure 3:
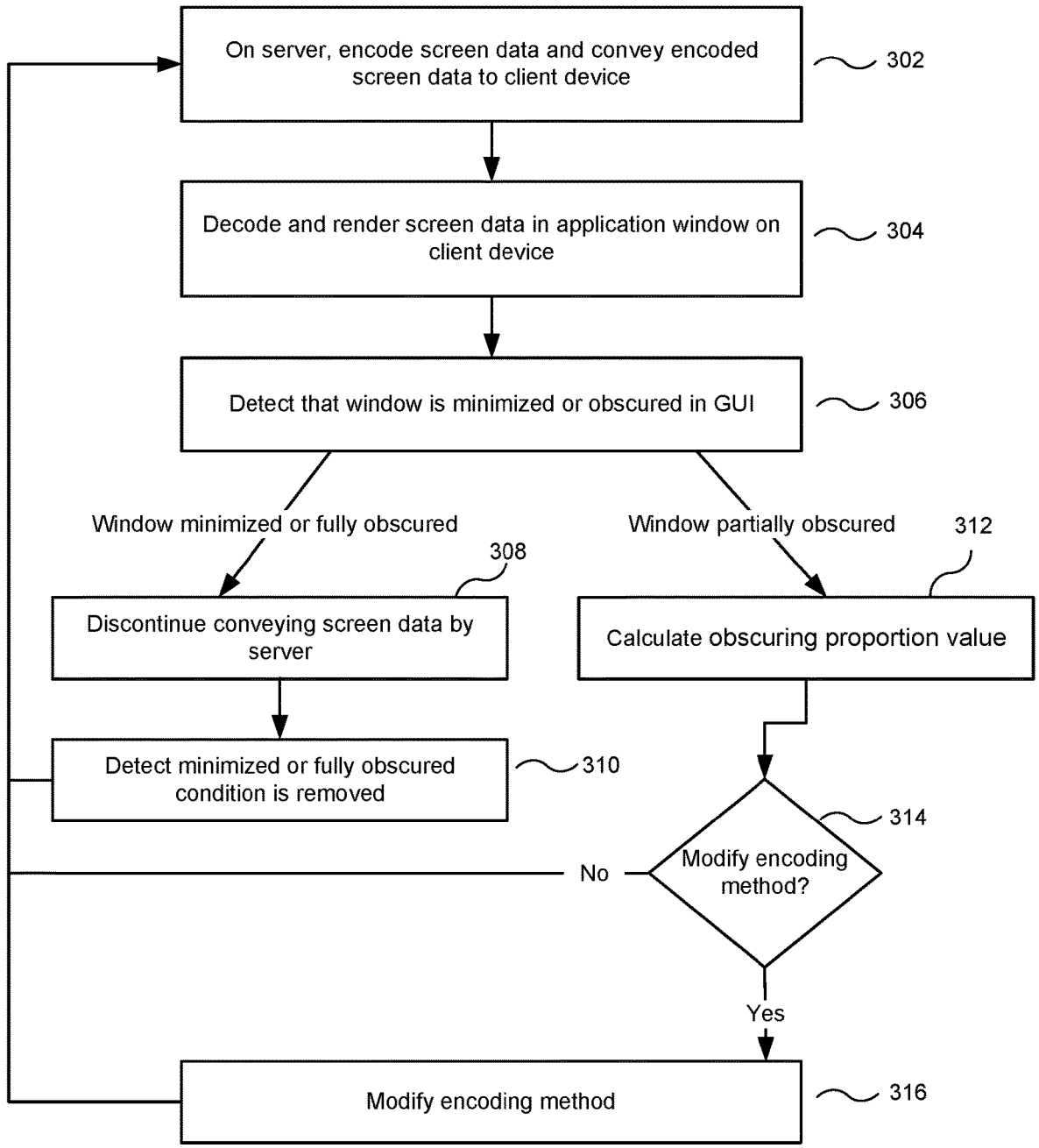
FIG. 3 illustrates an example process flow for adjusting streaming of screen data based on window visibility, in accordance with various embodiments.

FIG. 3 illustrates an example process flow for adjusting streaming of screen data based on window visibility, in accordance with various embodiments. The process can begin in operation 302 where a server can encode screen data using an encoding method and convey the encoded screen data to a client device. In various embodiments, an agent operating on the server can encode and transmit the data to a client operating on the client device. For example, in a VDI environment, the agent can be a virtual desktop agent in a virtual desktop executing on a server and the client can be a virtual desktop client running on a client device. In the VDI case, the encoded screen data sent by the agent to the client can convey the GUI of the virtual desktop. The example process of FIG. 3 can likewise be utilized in environments other than VDI for conveying different types of screen data from the server to the client device.

In operation 304, the screen data can be decoded and rendered in an application window (e.g., a window produced by the client, such as a virtual desktop client) on the client device, in the client device GUI. In operation 306, the system can detect that the window is minimized or obscured in the GUI. For example, a window tracker executing in the client can monitor window activity and/or the window region in the GUI and detect one of these events. If the event is a window minimized or fully obscured event, then the process can proceed to operation 308, where the server can discontinue conveying screen data. For example, the window minimized/fully obscured event can be passed to and analyzed by a decision module, which can determine to stop the streaming and instruct the agent accordingly.

In operation 310, the system can detect that the window minimized or fully obscured condition is removed (i.e., the window is no longer minimized or no longer fully obscured), and the process can return to operation 302, where the agent continues streaming the screen data to the client.

If, in operation 306 it is detected that the window is partially obscured, then the process can proceed to operation 312, where the system can calculate an obscuring proportion value. The process can then proceed to operation 314 where, based on the obscuring proportion value, it can determine if and how encoding should be modified. For example, the process can determine, using a policy and based on the obscuring proportion value, whether the encoding method should be modified and if so, how it should be modified (e.g., changing the frame rate). If it is determined that no modification is necessary, then the process can return to operation 302 where the screen data can continue to be streamed with the same parameters as previously. If, on the other hand, it is determined that the encoding method should be modified based on the policy, then the encoding method can be modified as indicated in the policy for the obscuring proportion value and the process can return to operation 302, where the screen data can continue to be streamed, but now with the modified parameters.

Figure 4:
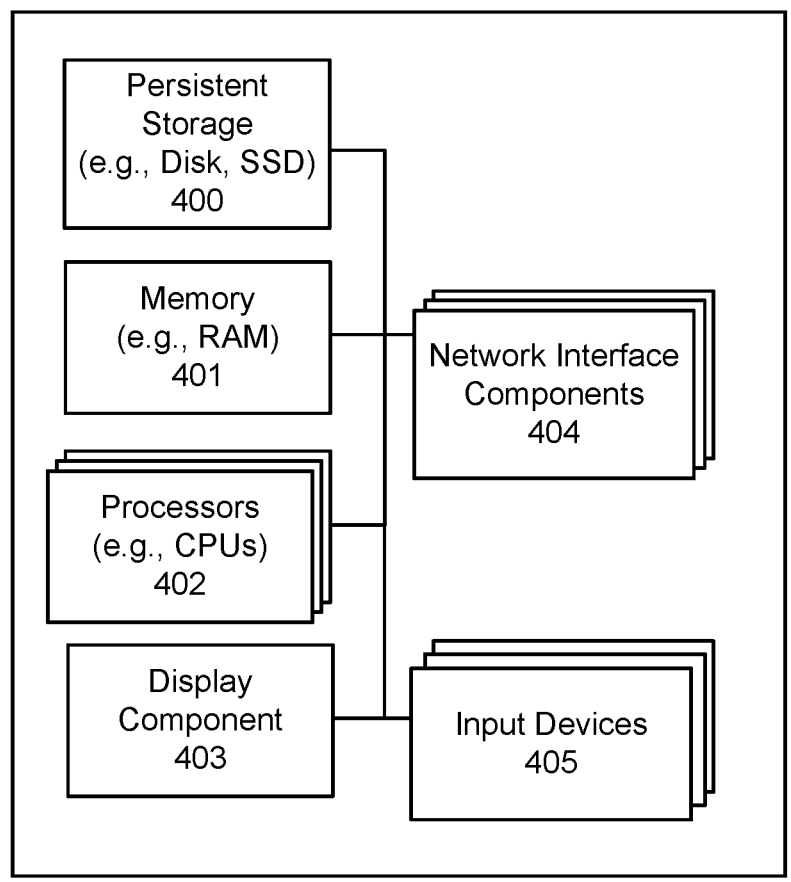
FIG. 4 illustrates an example of some general components of a computing device, in accordance with various embodiments.

FIG. 4 illustrates an example of some general components of a computing device, in accordance with various embodiments. In this particular example, the device includes one or more processors (e.g., central processing units (CPUs) 402 for executing instructions that can be stored in a storage medium component. The storage medium can include many types of memory, persistent data storage, or non-transitory computer-readable storage media. For example, the storage medium may take the form of random access memory (RAM) 401 storing program instructions for execution by the processor(s) 402, a persistent storage (e.g., disk or SSD) 400, a removable memory for sharing information with other devices and/or the like. The computing device typically can further comprise a display component 403, such as a monitor, a touch screen, liquid crystal display (LCD), or the like. In various embodiments, the computing device will include at least one input device 405 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 404 for communicating over various networks, such as a Wi-Fi®, Bluetooth®, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

The invention claimed is:

1. A method of generating a display of a window using screen data streamed to a client device from a remote device, comprising:
   on the client device, decoding first screen data streamed to the client device from the remote device and rendering the decoded first screen data in a window presented in a graphical user interface (GUI) of the client device;
   determining, by the client device, an obscuring proportion value corresponding to how much the window is obscured by other objects of the GUI that are not rendered from data streamed from the remote device, and transmitting the obscuring proportion value from the client device to the remote device; and
   on the client device, decoding second screen data streamed to the client device from the remote device and rendering the decoded second screen data in the window,
   wherein the remote device modifies a frame rate of the streamed screen data in accordance with the transmitted obscuring proportion value, such that the frame rate of the streamed second screen data is reduced partially but not completely from the frame rate of the streamed first screen data when the obscuring proportion value indicates that the window is partially but not completely obscured by the other objects of the GUI.

2. The method of claim 1, wherein
   the remote device, in response to determining that the window is minimized or fully obscured in the GUI, discontinues streaming of the screen data to the client device.

3. The method of claim 2, wherein the window is fully obscured in the GUI when one of:
   the window is fully covered by the other objects of the GUI;
   the window is fully covered by a lock screen; or
   the window is fully covered by a screen saver.

4. The method of claim 1, wherein the remote device modifies the frame rate of the streamed screen data based on a policy, the policy indicating the frame rate to be used when the transmitted obscuring proportion value exceeds a predefined threshold value.

5. The method of claim 1, wherein:
   the screen data comprises a GUI of a virtual desktop running on the remote device;
   the client device includes a virtual desktop client running therein;
   the remote device encodes the screen data comprising the virtual desktop GUI and conveys it to the virtual desktop client on the client device, the virtual desktop client being configured to display the virtual desktop GUI in the window and to convey user inputs targeting the virtual desktop made on the client device to the remote device to be effectuated in the virtual desktop;
   the virtual desktop client detects that the window is minimized or fully obscured in the GUI; and
   in response to the virtual desktop client detecting that the window is minimized or fully obscured in the GUI, the remote device discontinues streaming of the screen data to the client device.

6. A computing device, comprising:
   at least one processor; and
   memory including instructions that, when executed by the at least one processor, cause the computing device to perform a method of generating a display of a window using screen data streamed thereto from a remote device, said method comprising the steps of:
   decoding first screen data streamed thereto from the remote device and rendering the decoded first screen data in a window presented in a graphical user interface (GUI);

determining an obscuring proportion value corresponding to how much the window is obscured by other objects of the GUI that are not rendered from data streamed from the remote device, and transmitting the obscuring proportion value to the remote device; and decoding second screen data streamed thereto from the remote device and rendering the decoded second screen data in the window, wherein the remote device modifies a frame rate of the streamed screen data in accordance with the transmitted obscuring proportion value, such that the frame rate of the streamed second screen data is reduced partially but not completely from the frame rate of the streamed first screen data when the obscuring proportion value indicates that the window is partially but not completely obscured by the other objects of the GUI.

7. The computing device of claim 6, wherein
the remote device, in response to determining that the window is minimized or fully obscured in the GUI, discontinues streaming of the screen data.

8. The computing device of claim 7, wherein the window is fully obscured in the GUI when one of:
the window is fully covered by the other objects of the GUI;
the window is fully covered by a lock screen; or
the window is fully covered by a screen saver.

9. The computing device of claim 6, wherein the remote device modifies the frame rate of the streamed screen data based on a policy, the policy indicating the frame rate to be used when the transmitted obscuring proportion value exceeds a predefined threshold value.

10. The computing device of claim 6, wherein:
the screen data comprises a GUI of a virtual desktop running on the remote device;
the computing device has a virtual desktop client running therein;
the remote device encodes the screen data comprising the virtual desktop GUI and conveys it to the virtual desktop client, the virtual desktop client being configured to display the virtual desktop GUI in the window and to convey user inputs targeting the virtual desktop to the remote device to be effectuated in the virtual desktop;
the virtual desktop client detects that the window is minimized or fully obscured in the GUI; and
in response to the virtual desktop client detecting that the window is minimized or fully obscured in the GUI, the remote device discontinues streaming of the screen data.

11. A non-transitory computer readable storage medium comprising one or more sequences of instructions, the instructions when executed by one or more processors causing the one or more processors to execute a method of generating a display of a window using screen data streamed to a client device from a remote device, said method comprising the operations of:
decoding first screen data streamed to the client device from the remote device and rendering the decoded first screen data in a window presented in a graphical user interface (GUI) of the client device;

determining, by the client device, an obscuring proportion value corresponding to how much the window is obscured by other objects of the GUI that are not rendered from data streamed from the remote device, and transmitting the obscuring proportion value from the client device to the remote device; and decoding second screen data streamed to the client device from the remote device and rendering the decoded second screen data in the window, wherein the remote device modifies a frame rate of the streamed screen data in accordance with the transmitted obscuring proportion value, such that the frame rate of the streamed second screen data is reduced partially but not completely from the frame rate of the streamed first screen data when the obscuring proportion value indicates that the window is partially but not completely obscured by the other objects of the GUI.

12. The non-transitory computer readable storage medium of claim 11, wherein
the remote device, in response to determining that the window is minimized or fully obscured in the GUI, discontinues streaming of the screen data to the client device.

13. The non-transitory computer readable storage medium of claim 12, wherein the window is fully obscured in the GUI when one of:
the window is fully covered by the other objects of the GUI;
the window is fully covered by a lock screen; or
the window is fully covered by a screen saver.

14. The non-transitory computer readable storage medium of claim 11, wherein the remote device modifies the frame rate of the streamed screen data based on a policy, the policy indicating the frame rate to be used when the transmitted obscuring proportion value exceeds a predefined threshold value.

15. The non-transitory computer readable storage medium of claim 11, wherein:
the screen data comprises a GUI of a virtual desktop running on the remote device;
the client device includes a virtual desktop client running therein;
the remote device encodes the screen data comprising the virtual desktop GUI and conveys it to the virtual desktop client on the client device, the virtual desktop client being configured to display the virtual desktop GUI in the window and to convey user inputs targeting the virtual desktop made on the client device to the remote device to be effectuated in the virtual desktop;
the virtual desktop client detects that the window is minimized or fully obscured in the GUI; and
in response to the virtual desktop client detecting that the window is minimized or fully obscured in the GUI, the remote device discontinues streaming of the screen data to the client device.

\* \* \* \* \*